US006810313B2

(12) United States Patent
Cooper et al.

(10) Patent No.: US 6,810,313 B2
(45) Date of Patent: Oct. 26, 2004

(54) COMBINED OCCUPANT CHARACTERISTIC AND ACOUSTIC CRASH SENSOR ARRANGEMENT

(75) Inventors: Stephen R. W. Cooper, Fowlerville, MI (US); Kiran Ramanlal Magiawala, Hawthorne, CA (US)

(73) Assignee: TRW Inc., Lyndhurst, OH (US)

( * ) Notice: Subject to any disclaimer, the term of this patent is extended or adjusted under 35 U.S.C. 154(b) by 40 days.

(21) Appl. No.: 09/897,195

(22) Filed: Jul. 2, 2001

(65) Prior Publication Data

US 2003/0004629 A1 Jan. 2, 2003

(51) Int. Cl.[7] .............................................. G06F 7/00
(52) U.S. Cl. ...................................................... 701/45
(58) Field of Search ........................ 701/36, 45, 47–49, 701/58–60; 180/271–273; 280/727, 728.1–728.3, 729, 730.1–730.2, 731–735

(56) References Cited

U.S. PATENT DOCUMENTS

| | | | |
|---|---|---|---|
| 4,346,914 A | 8/1982 | Livers et al. | |
| 4,842,301 A | 6/1989 | Feldmaier | |
| 5,034,891 A | 7/1991 | Blackburn et al. | |
| 5,073,860 A | 12/1991 | Blackburn et al. | |
| 5,109,341 A | 4/1992 | Blackburn et al. | |
| 5,118,134 A * | 6/1992 | Mattes et al. | 280/735 |
| 5,185,701 A | 2/1993 | Blackburn et al. | |
| 5,216,607 A | 6/1993 | Diller et al. | |
| 5,232,243 A | 8/1993 | Blackburn et al. | |
| 5,251,161 A | 10/1993 | Gioutsos et al. | |
| 5,256,904 A * | 10/1993 | Tohbaru | 307/10.1 |
| 5,261,505 A | 11/1993 | Holroyd et al. | |
| 5,413,378 A | 5/1995 | Steffens, Jr. et al. | |
| 5,474,327 A | 12/1995 | Schousek | |
| 5,494,311 A | 2/1996 | Blackburn et al. | |
| 5,566,974 A | 10/1996 | Mazur et al. | |
| 5,585,702 A | 12/1996 | Jackson et al. | |
| 5,624,132 A | 4/1997 | Blackburn et al. | |
| 5,626,359 A | 5/1997 | Steffens, Jr. et al. | |
| 5,667,244 A | 9/1997 | Ito et al. | |
| 5,670,853 A | 9/1997 | Bauer | |
| 5,739,757 A * | 4/1998 | Gioutsos | 177/144 |
| 5,746,444 A | 5/1998 | Foo et al. | |
| 5,808,544 A * | 9/1998 | Kani et al. | 340/426 |
| 5,821,633 A | 10/1998 | Burke et al. | |
| 5,826,903 A | 10/1998 | Schiller et al. | |
| 5,884,203 A * | 3/1999 | Ross | 280/728.1 |
| 5,988,676 A * | 11/1999 | Lotito et al. | 177/144 |
| 5,991,676 A | 11/1999 | Podoloff et al. | |
| 6,007,095 A | 12/1999 | Stanley | |
| 6,081,757 A * | 6/2000 | Breed et al. | 701/45 |
| 6,242,701 B1 * | 6/2001 | Breed et al. | 177/144 |
| 6,516,258 B1 * | 2/2003 | Herrmann | 701/45 |

\* cited by examiner

*Primary Examiner*—Thu V. Nguyen
(74) *Attorney, Agent, or Firm*—Tarolli, Sundheim, Covell & Tummino L.L.P.

(57) ABSTRACT

An arrangement (14) is used in a vehicle (10), and contains an occupant characteristic sensor (36), a filter (62) and a controller (24). The sensor (36) senses an occupant characteristic and outputs a signal indicative thereof. The filter (62) and the controller (24) operate to monitor the signal for a frequency component indicative of a vehicle crash event. In one example, the arrangement (14) is part of an occupant protection system (12) that includes an actuatable protection device (16). The controller (24) controlling actuation of the protection device (16) in response to the filtered frequency component.

9 Claims, 2 Drawing Sheets

COMBINED OCCUPANT CHARACTERISTIC AND ACOUSTIC CRASH SENSOR ARRANGEMENT

TECHNICAL FIELD

The present invention is directed to a combined occupant characteristic and crash sensor arrangement, and more particularly to an arrangement for acoustically sensing a crash event via the output of an occupant characteristic sensor.

BACKGROUND OF THE INVENTION

Occupant protection systems are well known in the art and are employed in vehicles to protect vehicle occupants during crash events. Most occupant protection systems include one or more actuatable protecting components, such as air bags, seat belt pretensioners, side curtains, etc. During a crash event, these components may be actuated to physically engage an occupant and protect the occupant during a crash event.

Deployment or actuation of an actuatable protection component is usually dependent upon numerous criteria, such as one or more vehicle crash conditions, and possibly one or more occupant characteristics. Vehicle crash conditions are indicative of the occurrence of a vehicle crash event. Further, the crash conditions may indicate whether a crash event is a deployment crash event. A deployment crash event is a crash event that warrants actuation or deployment of the actuatable protection component. In one example, a determination of whether a deployment crash event is occurring is based upon a determination of whether a sensed crash metric, such as crash acceleration, exceeds a threshold value.

With respect to sensing crash conditions, multiple sensors are often placed at a variety of locations throughout the vehicle to sense crash conditions. These sensors usually sense the occurrence of a crash event and output signals indicative thereof. The signals are typically sent to a controller (typically a microprocessor or microcomputer) for a determination of whether the crash event is a deployment crash event. Most often, the controller discriminates between a deployment and a non-deployment crash event by applying a crash algorithm to the signals.

Accelerometers are the type of sensors most often used to sense and indicate the occurrence of a crash event. U.S. Pat. No. 5,670,853, for instance, discloses an occupant protection system that uses an accelerometer to sense a crash event.

Accelerometers are well known in the art and, therefore, their inter-workings are not discussed in great detail. Suffice it to say, most accelerometers have moving parts and sense acceleration through the movement of those moving parts relative to one another. Additionally, most accelerometers have an axis of sensitivity that corresponds to the direction in which the accelerometers sense acceleration.

Accordingly, to effectively sense a crash event that has an orientation along a particular direction with an accelerometer, the accelerometer is oriented in the same direction. For instance, to sense a side impact crash event, the accelerometer is typically oriented in the vehicle such that its axis of sensitivity corresponds to a side-to-side direction of the vehicle. Similarly, orienting the axis of sensitivity in front to rear direction of the vehicle enables the accelerometer to sense front to rear crash events. U.S. Pat. Nos. 5,826,903 and 5,746,444, for example, disclose crash event sensing with accelerometers oriented with their axes sensitivity from side-to-side or front-to-back in the vehicle.

An acoustic sensor is another sensor type that is used to sense crash events. For instance, U.S. Pat. Nos. 5,884,203, 4,842,301, and 4,346,914 disclose acoustic sensors that are used to sense crash events.

Acoustic crash sensors sense crash events off of vibrations that are introduced into a vehicle during a crash event. The vibrations, may, for example, be the result of acoustic waves that are caused by deformation of the vehicle body during a crash event. Acoustic sensors sense these vibrations and output signals indicative thereof. Acoustic sensors are often acoustic transducers, such as ultrasonic sensors which sense high frequency acoustic waves that propagate through the vehicle during the occurrence of a vehicle crash event. Ultrasonic sensors convert the sensed acoustic waves into signals having electrical characteristics indicative of the acoustic waves or vibrations transmitted through the vehicle during a crash event.

Ultrasonic sensors typically do not rely on moving parts to be actuated. As such, they have a short response time relative to other sensors. Additionally, ultrasonic sensors are usually omni-directional, meaning that they detect acoustic waves or vibrations originating from any direction in the vehicle. As such, ultrasonic sensors can rapidly sense crash events originating from most any direction in the vehicle.

With regard to occupant characteristics, these often include the weight and/or position of the occupant (e.g. whether the sensed occupant is a large adult seated close to the vehicle dashboard). Numerous sensors are typically employed in occupant protection systems to sense the various criteria with regard to the occupant characteristics. These sensors sense the criteria and output signals indicative thereof. The signals are usually sent to the controller. The controller then uses these signals to determine control of the actuatable protection component.

With respect to sensing occupant characteristics, many different types of sensors and sensing methodologies are known to sense many different occupant characteristics, such as occupant weight and/or position. These sensors sense the occupant characteristics and output signals indicative thereof.

Occupant characteristics, such as weight and position may be important because they can affect how and to what extent a protection component, such as an air bag should be deployed. With respect to occupant position, for example, if the occupant is moved in a direction toward the air bag during a crash event, it may be desirable to only partially inflate the air bag as the occupant's motion expedites the engagement of the air bag and the occupant. Alternatively, if the occupant is moved completely out of position during a crash event, such that deployment of the air bag would offer little or no protection to the occupant. Thus, the deployment of the air bag may be suppressed. With respect to sensing occupant position, U.S. Pat. No. 5,670,853, for example, discloses that occupant position may be sensed using different arrangements, such as with a plurality of ultrasonic sensors mounted at various locations within a vehicle.

With respect to the weight of the occupant, the occupant's weight may affect how and to what extent a protection component, such as an air bag, should be deployed. A larger occupant may, for example, require full deployment to afford the desired protection to the occupant, whereas a smaller occupant may only require partial deployment to protection the occupant in a desired fashion.

With respect to sensing the weight off the occupant, numerous types of weight sensing devices have been developed to determine the weight of an occupant. Some weight sensors are mounted within the seat cushion of a vehicle seat while other weight sensors are mounted between the seat and the vehicle body. Typically, a transducer, such as a piezoelectric device, magnetostrictive device, or a strain gauge, is used to convert a load applied to the seat into an electrical signal indicative of the applied load (e.g. the occupant's weight). For instance, U.S. Pat. Nos. 5,624,132, 5,494,311, and 5,232,243 disclose using force sense resistors to sense the weight of an occupant. U.S. Pat. No. 5,991,676 and U.S. Pat. No. 5,474,327 disclose using variable resistance weight sensors to sense the weight of an occupant. U.S. Pat. No. 5,739,757 discloses using a magnetic weight sensor to sense the weight of an occupant.

It is well known that vibrations present in a vehicle (resulting from a crash event or from simple road noise) typically propagate throughout the entirety of the vehicle. As such, these vibrations can affect the sensors within the vehicle. More particularly, the sensors sense these vibrations and frequency components indicative of the vibrations are embedded within the signals output by the sensors. These frequency components are undesirable and the signals output from these sensors are, therefore, usually filtered to filter out the effects of these vibrations. U.S. Pat. Nos. 5,739,757 and 5,624,132, for example, disclose that the output from weight sensors is filtered. U.S. Pat. No. 4,842,301 discloses that the output from an acoustic sensor is filtered to filter out noise, such as road noise and/or collision noise, such as noise that would result from collision with a deer.

SUMMARY OF THE INVENTION

In accordance with one aspect, the present invention provides an arrangement for use in a vehicle. Occupant characteristic sensor means senses an occupant characteristic and outputs a signal indicative thereof. Means monitors the signal for a frequency component indicative of a vehicle crash event.

In accordance with another aspect, the present invention provides an occupant protection system for use in a vehicle. The system includes an actuatable protection device. Occupant characteristic sensor means senses an occupant characteristic and outputs a sensor signal indicative thereof. Filter means, operatively connected to the occupant characteristic sensor means, passes a frequency component of the sensor signal indicative of a vehicle crash. Controller means, operatively connected to the protection device, the occupant characteristic sensor means and the filter means, controls actuation of the protection device in response to the sensor signal and the filtered frequency component.

In accordance with another aspect, the present invention provides a method of sensing and monitoring for use in a vehicle. An occupant characteristic is sensed. A signal indicative of the sensed occupant characteristic is output. The signal is monitored for a frequency component indicative of a vehicle crash event.

In accordance with yet another aspect, the present invention provides a method of protecting an occupant in a vehicle with an actuatable protection device. An occupant characteristic is sensed. A sensor signal indicative of the sensed occupant characteristic is output. The sensor signal is filtered to pass a frequency component of the sensor signal indicative of a vehicle crash. Actuation of the protection device is controlled in response to the sensor signal and the filtered frequency component.

BRIEF DESCRIPTION OF THE DRAWINGS

The foregoing and other features and advantages of the present invention will become more apparent to one skilled in the art upon consideration of the following description of the invention and the accompanying drawings, wherein.

DESCRIPTION OF EXAMPLE EMBODIMENTS

Figure 1:
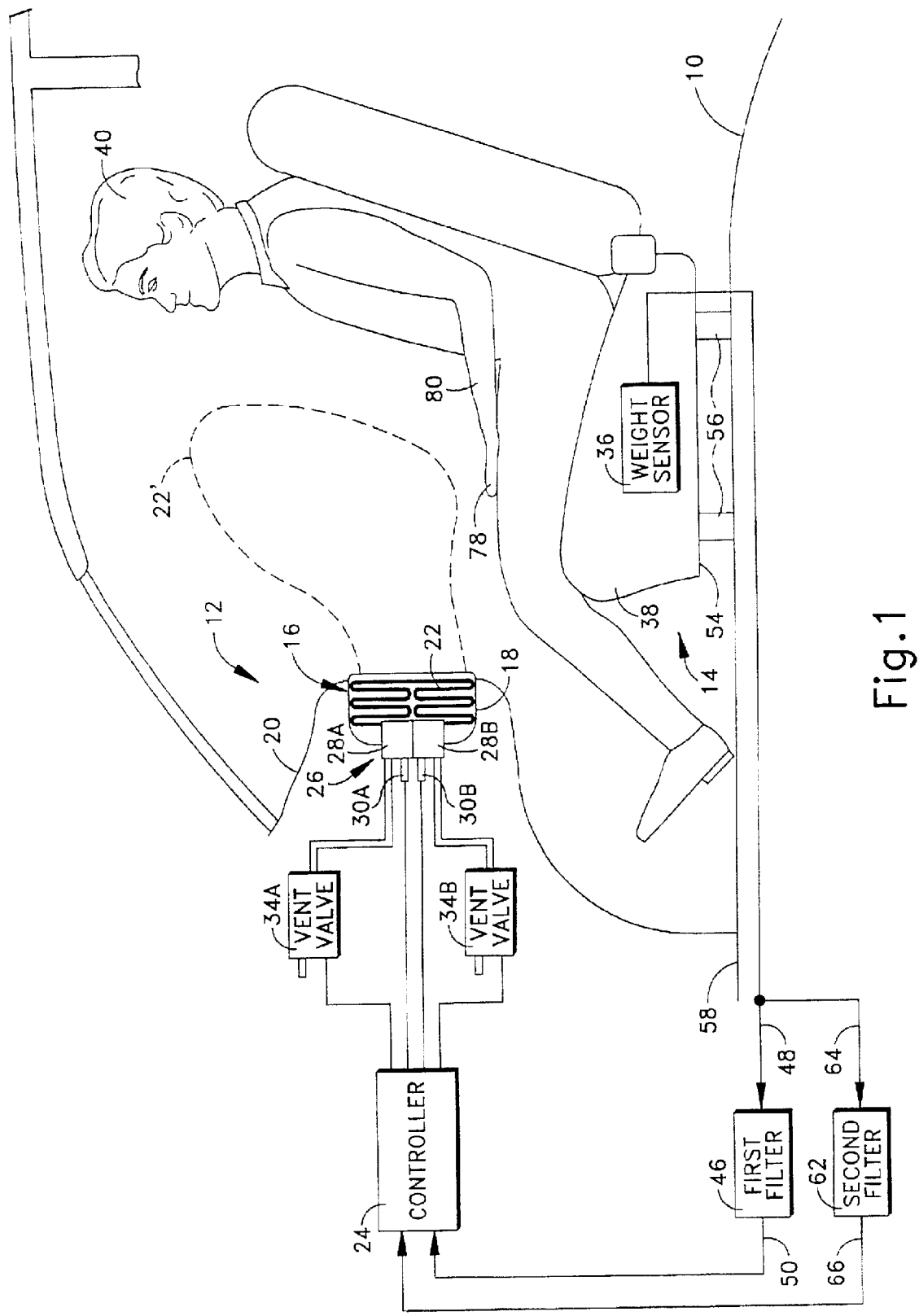
FIG. 1 is a schematic illustration of a vehicle that includes an occupant protection system wherein a combined occupant characteristic and crash sensor arrangement in accordance with the present invention is incorporated.

FIG. 1 illustrates a vehicle 10 with an example occupant protection system 12 that includes a combined occupant characteristic and crash sensor arrangement 14 in accordance with the present invention. The protection system 12 includes an actuatable protection device 16. In the illustrated example, the protection device 16 is an air bag module 16.

The air bag module 16 includes a housing 18 that is mounted in an instrument panel 20 of the vehicle 10. An air bag 22 is stored in a folded condition within the housing 18, and is configured for inflation to a deployed state 22' (shown in phantom) as is known in the art.

An inflation fluid (e.g., nitrogen gas) source arrangement 26 is provided to inflate the air bag 22. In the illustrated example, two sources 28A, 28B of inflation fluid are operatively connected to the air bag 22. Each inflation fluid source (e.g., 28A) includes pyrotechnic material that is operatively connected to an electrically ignitable squib (e.g., 30A). Ignition of the squib (e.g., 30A) causes the pyrotechnic material of the respective fluid source (e.g., 28A) to combust and generate gas. Hereinafter, ignition and combustion is referred to as activation of an inflation fluid source. Of course, it is to be appreciated that the inflation fluid source arrangement 26 may be different (e.g., single source, pressurized fluid source, or hybrid pressurized fluid/fluid generation source).

Air bag deployment profile (e.g., rate at which the air bag 22 is inflated and/or inflation pressure within the air bag) is changed by controlling how and when the two inflation fluid sources 28A and 28B are activated. For instance, a lower inflation pressure is achieved when only a single inflation fluid source (e.g., 28A) is activated. Alternatively, rapid deployment at a higher inflation pressure of the air bag 22 is effected when both of the inflation fluid sources 28A and 28B are simultaneously activated.

One or more vent valves (e.g., 34A) are provided to also control the deployment profile of the air bag 22. In the illustrated example, two vent valves 34A, 34B are provided, with each valve (e.g., 34A) being operatively connected to a respective one of the inflation fluid source (e.g., 28A). When opened, a vent valve (e.g., 34A) vents a portion of the inflation fluid away from the air bag 22. Accordingly, when a vent valve (e.g., 34A) is fully opened a fair amount of inflation fluid is vented away from the air bag 22 and the air bag receives a lesser volume of inflation fluid. Conversely, when a vent valve (e.g., 34A) is not opened or is only opened slightly, very little of the inflation fluid is vented away from the air bag 22 and the air bag receives a full amount of fluid from an associated inflation fluid source (e.g., 28A). It is to be appreciated that, although the illustrated example is shown with two inflation fluid sources 28A and 28B and two vent valves 34A and 34B to provide a means by which adjustment to the deployment profile is achieved, different structures and/or configurations could be utilized to achieve deployment profile adjustment.

A controller 24 controls deployment of the air bag 22 in response to the sensory input received from the combined sensor arrangement 14. Upon a determination to deploy the air bag 22, the controller 24 generates one or two ignition signals. Each ignition signal is sent to a respective one of the squibs (e.g., 30A). Upon receipt of an ignition signal, the squib ignites and causes combustion of the pyrotechnic material. The controller 24 also generated control signal(s) for the vent valves 34A and 34B to cause opening or closing accordingly in response to the sensory input received from the combined sensor arrangement 14.

In one example, the controller 24 is a microcomputer or microprocessor. The functionality of the controller 24 may, alternatively, be performed by one or more digital and/or analog circuits. The controller 24 also may be embodied in an application specific integrated circuit.

Turning to the combined sensor arrangement 14, a weight sensor 36 of the arrangement is located within a vehicle seat 38. The weight sensor senses weight of an occupant 40 by responding to load-force placed upon the seat 38. Weight of an occupant is one example of an occupant characteristic. In one example of specific detail, the weight sensor 36 includes a variable resistance circuit whose resistance changes in response to the load place upon the seat. Accordingly, the weight sensor 36 provides an electrical signal indicative of the weight of the occupant 40. Specific structures for such a variable resistance weight type sensor are well known in the art.

A first filter 46 is operatively connected 48 to an output of the weight sensor 36 and is operatively connected 50 to the controller 24. In general, the first filter 46 filters unwanted noise from the output of the weight sensor 36. The filtering is to eliminate frequencies resulting from extraneous vehicle operating events and/or road noise. As examples, the first filter 46 comprises hardware, such as high-pass, low-pass, and/or bandpass filters, to accomplish the filtering function. In one example, the filtering function provides for a cut-off frequency at several hundred Hertz or less. Thus, for such an example, the first filter 46 is a low-pass filter. The filtered signal provided by the first filter 46 to the controller 24 is thus indicative of the sensed occupant characteristic (e.g., weight). As mentioned above, the controller 24 uses the sensed weight, as the occupant characteristic, to make determinations regarding control of the air bag 22 deployment.

It is to be noted that the weight sensor 36 is interconnected to a seat frame 54 and/or seat mounting brackets 56. In turn, the mounting brackets 56 are connected to a rigid structural member, such as the floor pan 58, of the vehicle 10. Thus, the weight sensor 36 is subject to vibrations, such as vibrations associated with a vehicle crash, that propagate through the vehicle 10. Accordingly, the weight sensor 36 reacts to such vibrations and thus the output of the sensor is indicative of the vibrations. In one respect, the vibrations are acoustic.

Turning back to the structure of the combined sensor arrangement 14, a second filter 62 is operatively connected 64 to the weight sensor 36 and is operatively connected 66 to the controller 24. Specifically, the second filter 62 is between the weight sensor 36 and the controller 24, and receives the same output signal from the weight sensor as the first filter 46. Thus, in some respects, the first and second filters 46 and 62 are operating in parallel on the output signal of the weight sensor 36.

The second filter 62 permits passage of one or more certain frequencies that are indicative of a crash event. Thus, the controller 24 receives a signal that indicates the crash event. As mentioned, because the weight sensor 36 is rigidly interconnect to portions (e.g. floor pan 58) of the vehicle 10, vehicle-born vibrations, such as those that result from a crash event, are readily propagated to the weight sensor. Accordingly, the output from the weight sensor 36 is also indicative of a crash, as indicated by the vibration. In sum, the weight sensor has acoustic sensor features. Further, the sensing is omni-directional crash sensing and has a rapid response time because of the propagation through the vehicle.

Empirical testing is used to determine the one or more frequency values indicative of a vehicle crash. In part, the vehicle platform of interest is a factor in the relevant frequencies. In one example, the indicative frequency corresponds to the frequency of deforming metal. In one example, the one or more frequencies that pass through the second filter 62 are in the ultrasonic range and/or on the order of 50–150 kHz.

It is to be appreciated that the second filter 62 may be provided by any filtering arrangement to permit passage of the desired frequency component(s) (i.e., indicative of a crash event) within the weight sensor output signal. Thus, the second filter 62 may comprise high-pass, low-pass, and/or band-pass filters, but preferably comprises a high-pass filter.

The controller 24 monitors the filtered output from the first filter 46 for an indication of the occupant characteristic (e.g., occupant weight) and monitors the filtered output from the second filter 62 for an indication of a crash event. Of course, the filtering by the first and second filters 46 and 62 is applied to a single signal from a single sensor (e.g., the weight sensor 36). Accordingly, the system provides for determination of both an occupant characteristic (e.g., occupant weight) and a crash event via a single sensor (e.g., the weight sensor 36).

Figure 2:
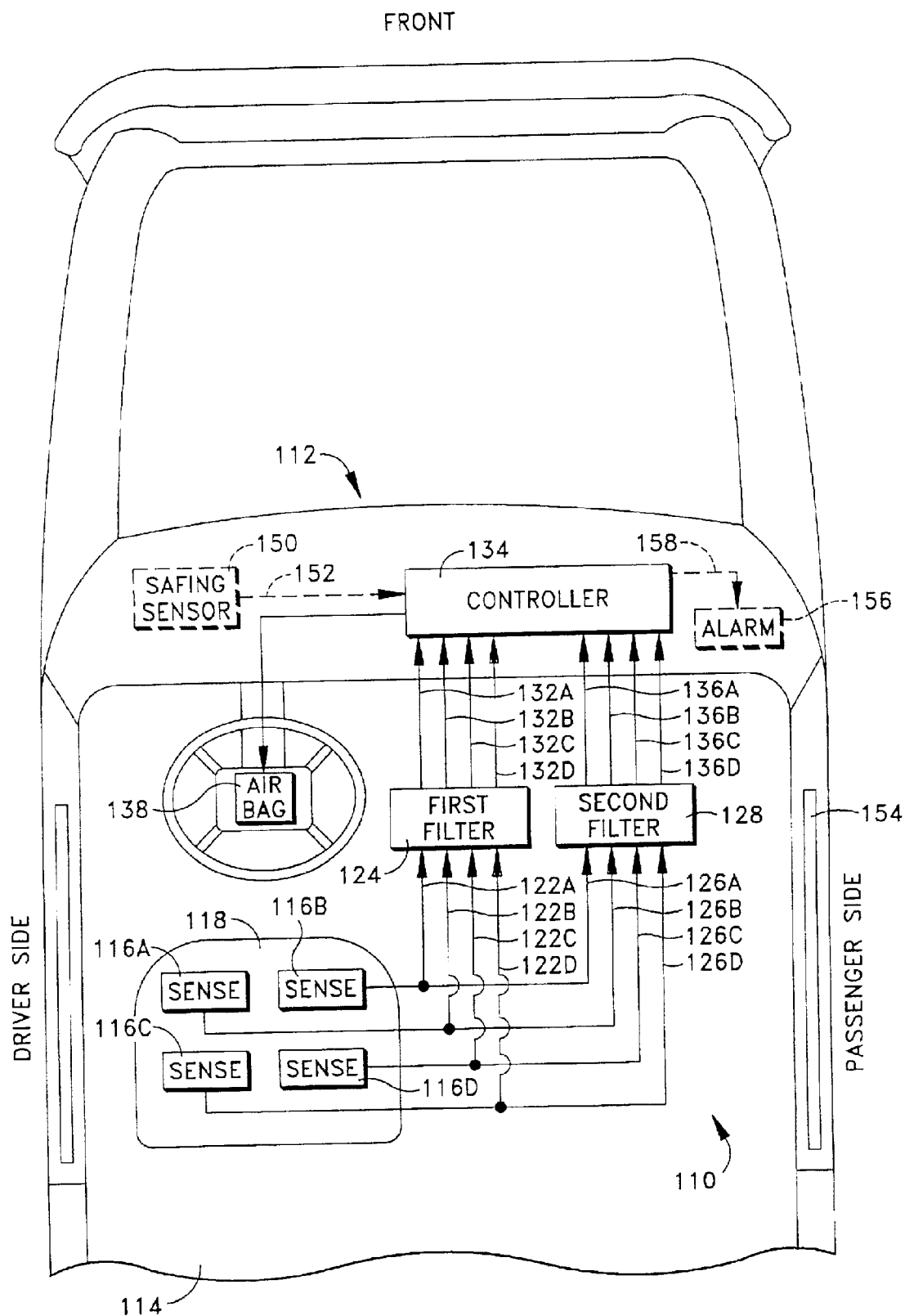
FIG. 2 is a schematic illustration providing a plan view of a vehicle that includes an occupant protection system with another embodiment of a combined occupant characteristic and crash sensor arrangement in accordance with the present invention.

FIG. 2 shows another embodiment of a combined occupant characteristic and crash sensor arrangement 110, in accordance with the present invention, within an occupant protection system 112 for a vehicle 114. In the embodiment of FIG. 2, the occupant characteristic and crash sensor arrangement 110 includes a plurality of sensors (e.g., 116A–116D) that sense one or more occupant characteristics. In the illustrated example, the sensors 116A–116D sense occupant weight and occupant position. Each sensor (e.g., 116A) is located in a respective one of four corners or quadrants of a vehicle seat 118.

The sensors 116A–116D are operatively connected 122A–122D, respectively, to a first filter 124, and are operatively connected 126A–126D, respectively, to a second filter 128. The first filter 124 is operatively connected 132A–132D to a controller 134, and the second filter 128 is operatively connected 136A–136D to the controller. The first and second filters 124 and 128 operate similar to the first and second filters 46 and 62, respectively, of the first embodiment (FIG. 1), except for handling four inputs. In order to handle the four inputs (see the second embodiment, FIG. 2), each of the first and second filters 124 and 128 provides for multiplexing into a single filter element or parallel filter elements.

The controller 134 monitors the output of the second filter 128 for one or more frequency components indicative of a crash event, and controls actuation of an air bag module 138 in response thereto. Such an embodiment has a feature of providing an ability of determining directionality of the crash event. More particularly, where one sensor outputs a signal containing a frequency component indicative of a crash event before other sensors do, this may give an indication of the direction of the crash event. This is due to the fact that crash vibrations usually propagate away from the initial crash event and therefore affect the sensor nearest the crash event before propagating to and affecting sensors located away from the crash event.

For example, if vibrations propagate into the two sensors 116A and 116C located nearest the driver side of the vehicle 114 before propagating into the sensors 116B and 116D, the two weight sensors 116A and 116C are affected before the sensors 116B and 116D. The outputs of the two weight sensors 116A and 116C have frequency components indicative of the crash event before the outputs of the sensors 116B and 116D have such frequency components. Such a timing pattern is indicative of the crash event occurred at the driver side of the vehicle 114. Similarly, if vibrations propagate into the two sensors 116B and 116D located nearest the passenger side of the vehicle 114 before propagating into the sensors 116A and 116C, the timing pattern is indicative of the crash event occurred at the passenger side of the vehicle 114.

In addition to using the order within which sensors 116A–116D are affected by a crash event, the controller may also use time measurement between sensor reaction (e.g., arrival of the signals containing frequency components) to determine the type and direction of a crash event (e.g. front, side, rear or oblique crashes). For instance, a specific lag time may exist between the arrival time of a filtered signal from one of the sensors (e.g., 116A) and the arrival time of a filter signal from another sensor (e.g., 116D). This lag time may be different for different types of crash events (e.g. front, rear or oblique crashes). The lag time between arrival of the signals may be empirically determined from test data. More particularly, experiments may be done to empirically determine the lag time for different crash events taking into account the location of the sensors relative to one another. This empirical data may then be stored in the controller 134 and used by the controller to determine a particular type of crash event depending upon the relative location of the sensors and the lag time. This data may also be developed taking into account different vehicle platforms.

Consider the example of a first occupant characteristic sensor (e.g., 116A) outputting a signal containing a frequency component indicative of a crash event that is received at the controller 134 at time T1, and a second occupant characteristic sensor (e.g., 116B) subsequently outputting a signal containing a frequency component indicative of a crash event that is received at the controller 134 at time T2. Given the relative location of the sensors and the particular platform of interest, the lag time or difference between T1 and T2 may be used by the controller 134 to give an indication of the type of crash event by comparing that information to empirically stored data for the same relative location of the sensors and the same vehicle platform. Therefore, depending upon the location of the sensors and the vehicle platform, the controller 134 can use the difference between arrival times, in conjunction with the empirical data, to determine the type and direction of a crash event. The controller 134 can then control actuation of the air bag module 138 in response to the determined direction of the sensed crash event.

As an optional feature, a separate crash sensor 150 (e.g. an accelerometer) may be provided within the vehicle 114. The crash sensor 150 is operatively connected to the controller 134, and the controller is programmed to receive a crash-indicative signal from the crash sensor. The crash-indicative signal is used as a safing signal. Specifically, the crash-indicative signal is used by the controller 134 to verify that a crash event is, in fact, occurring. In one example, the controller processes (e.g., via a safing algorithm) the crash-indicative signal to make a determination regarding the verification of the crash event. Safing algorithms are known and are thus not discussed in detail.

As yet another, different, optional feature, a crash indication may be determined via determination of change in the occupant center of gravity (COG). COG is determined via analysis of weight distribution among the plurality of weight sensors 116A–116D located within the vehicle seat 118. This again reduces the need for additional sensors (e.g., a separate safing accelerometer).

As yet still another optional feature, in addition to sensing a crash event, the portions of the system 112 may be adapted to sense an intrusion event (e.g., entering for the purpose of theft) at the vehicle. More particularly, the second filter 128, or yet a third filter) may be tuned or constructed with high, low, and/or band-pass filter elements to allow frequency components indicative of an intrusion event to be passed to the controller 134.

For instance, the second filter 128 (or other filter) may allow passage of frequencies corresponding to breaking a window glass 154 of the vehicle 114. As with deforming metal during a crash event, breaking glass would affect the sensors 116A–116D and the outputs thereby would contain frequency component(s) indicative of the breaking glass. The passed frequencies are provided to the controller 134. An optional alarm 156, connected 158 to the controller 134, is provided.

When the vehicle 114 is turned off, locked and a possibly a security system (not shown) has been set, the controller 134 would make determinations regarding intrusion. Upon receipt of frequency components indicative of breaking glass, a determination of intrusion is made, and the alarm 156 is sounded.

The present invention provides an ability of reducing the number of sensors used in occupant protection systems without sacrificing resolution of the sensed crash event and/or sensed occupant characteristic. Such an ability promotes cost savings and simplicity of configuration.

It is to be appreciated that any type of occupant characteristic sensor for sensing any type of occupant characteristic may be used in the present invention, provided that the signals output thereby contain a frequency component indicative of vehicle born vibrations, such as vibrations that result from a crash event. This may include, for instance, any type of position sensor, such as an ultrasonic sensor, that senses the position of the occupant and/or any type of weight sensor, such as a variable resistance sensor that senses the weight of the occupant.

From the above description of the invention, those skilled in the art will perceive improvements, changes and modifications. Such improvements, changes and modifications are intended to be included within the scope of the appended claims.

Having described the invention, the following is claimed:

1. An occupant protection system for use in a vehicle, said protection system comprising:

an actuatable protection device;

occupant characteristic sensor means for sensing an occupant characteristic and outputting a sensor signal having a first frequency component that is indicative of the sensed occupant characteristic and having a second, different frequency component that is indicative of a vehicle crash condition;

first filter means, operatively connected to said occupant characteristic sensor means, for passing the first frequency component;

second filter means, operatively connected to said occupant characteristic sensor means, for passing the second frequency component; and controller means, operatively connected to said protection device, said occupant characteristic sensor means and said first and second filter means, for controlling actuation of said protection device in response to the first and second frequency components, wherein said occupant characteristic sensor means includes an occupant weight sensor means for sensing weight and wherein the sensed occupant characteristic is a weight of the occupant.

2. A system as set forth in claim 1, wherein said weight sensor means is a first weight sensor means, the sensor signal is a first sensor signal, and said filter means is a first filter means, said system comprises a plurality of weight sensor means, each operatively connected to said controller means and each for outputting a respective sensor signal, and a plurality of filter means, each operatively connected to a respective weight sensor means and said controller means and each for passing a frequency component of the respective sensor signal indicative of a vehicle crash, said controller means controlling actuation of said actuatable protection device in response to the plurality of sensor signals and the plurality of filtered frequency components.

3. A system as set forth in claim 1, wherein the second frequency component lies within the ultrasonic range of frequencies.

4. A system as set forth in claim 1, further comprising third filter means, operatively connected to said occupant characteristic sensor means and said controller means, for passing a third, different frequency component indicative of a vehicle intrusion event, and alarm means, operatively connected to said controller means, for providing an alarm warning, and said controller means including means for controlling said intrusion alarm means in response to the third frequency component indicating a vehicle intrusion event.

5. An occupant protection system for use in a vehicle, said protection system comprising:

an actuatable protection device;

occupant characteristic sensor means for sensing an occupant characteristic and outputting a sensor signal indicative of the sensed occupant characteristic;

filter means, operatively connected to said occupant characteristic sensor means, for passing a frequency component of the sensor signal indicative of a vehicle crash; and controller means, operatively connected to said protection device, said occupant characteristic sensor means and said filter means, for controlling actuation of said protection device in response to the sensor signal and the filtered frequency component, wherein said occupant characteristic sensor means includes an occupant weight sensor means for sensing weight, and wherein said weight sensor means is a first weight sensor means, the sensor signal is a first sensor signal, and said filter means is a first filter means, said system further comprises second weight sensor means, operatively connected to said controller means, for outputting a second sensor signal, and second filter means, operatively connected to said second weight sensor means and said controller means, for passing a frequency component of the second sensor signal indicative of a vehicle crash, and said controller means controlling actuation of said protection device in response to the first and second sensor signals and the first and second filtered frequency components.

6. A system as set forth in claim 5, wherein said first and second weight sensor means are disposed at different locations within the vehicle, and said controller means including means for determining a crash direction from the first and second filtered frequency components.

7. A system as set forth in claim 6, wherein said controller means includes means for determining the crash direction from the order within which said controller means receives the first and second filtered frequency components.

8. A system as set forth in claim 7, wherein said controller means includes means for determining the crash direction from the difference between arrival times of the first and second filtered frequency components at said controller means.

9. A method of protecting an occupant in a vehicle with an actuatable protection device, said method comprising:

sensing an occupant characteristic;

outputting a sensor signal having a first frequency component that is indicative of the sensed occupant characteristic and having a second, different frequency component that is indicative of a vehicle crash event;

filtering the first and second frequency components of the sensor signal; and controlling actuation of the protection device in response to the first and second frequency components of the sensor signal, wherein said step of sensing an occupant characteristic includes sensing weight.

* * * * *